(No Model.)
J. E. SLENTZ.
DAMPER.
No. 586,571. Patented July 20, 1897.
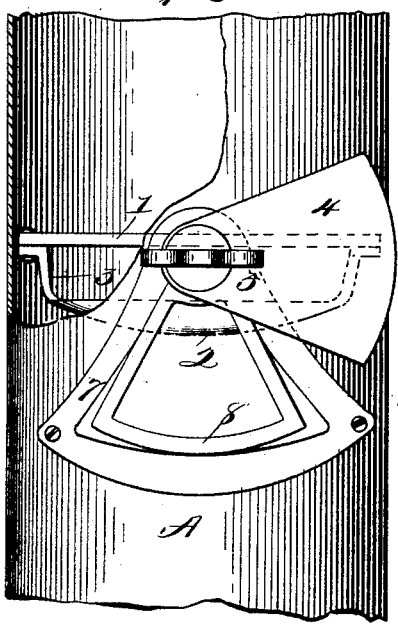
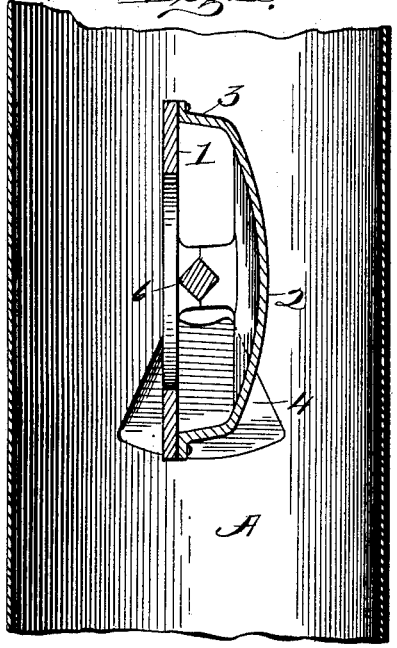
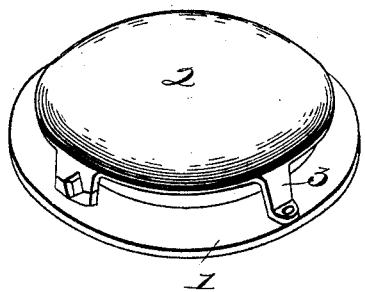
Witnesses:
J. M. Fowler Jr.
T. D. Godman
Inventor
John Edward Slentz.
By John T. Hyer
his Attorney.

UNITED STATES PATENT OFFICE.

JOHN EDWARD SLENTZ, OF GETTYSBURG, PENNSYLVANIA.

DAMPER.

SPECIFICATION forming part of Letters Patent No. 586,571, dated July 20, 1897.

Application filed November 10, 1896. Serial No. 611,662. (No model.)

*To all whom it may concern:*

Be it known that I, JOHN EDWARD SLENTZ, a citizen of the United States, residing at Gettysburg, in the county of Adams and State of Pennsylvania, have invented certain new and useful Improvements in Dampers; and I do hereby declare the following to be a full, clear, and exact description of the invention, such as will enable others skilled in the art to which it appertains to make and use the same.

The invention consists of a combined smoke and draft or cold-air damper for stove and other pipes; and it consists of a damper applied and operated inside of the pipe and a cold-air or draft damper arranged on the exterior surface of the pipe.

The object of the invention is to construct a damper that will retard the burning gases, prevent the heat from escaping up the flue, and also act as a ventilator for room, cellar, or other apartment, and as a check for the fire.

The invention will presently be described in such full, clear, concise, and exact terms that any person familiar with the art may make, construct, and use the same.

Referring to the drawings, forming a part of this specification and in which like reference-numerals indicate corresponding parts, Figure 1 is a front elevation of a piece of pipe with a section broken away to show the construction. Fig. 2 is a longitudinal central section, and Fig. 3 is a perspective view of the heat-damper detached.

A represents the pipe.

The heat-damper comprises an annular part 1 of such size or circumference as to fit the pipe in which it is to be used.

2 is a convexo-concave or dome-shaped plate depending from the annular plate 1. The plate 2 has legs or brackets 3, which may be formed integral with the plate, or they may be made separate and attached thereto. The two plates forming the smoke-damper, as first described, are connected together by screws or rivets, as shown, and at a suitable distance from each other.

The ring 1 is preferably formed with a foot 7 on each side, which, with a corresponding foot on plate 2, forms a bearing for the rod or spindle 6, by means of which the damper is revolved to open and close the same. The two feet on the ring 1 and convexo-concave plate 2 form two of the brackets 3 on opposite sides, each having a triangular cut-out portion which, when the two parts are united, form a lozenge-shaped aperture which forms a bearing for the rod or spindle 6, which is correspondingly shaped in cross-section, but any suitable bearings may be provided.

A rod or spindle 6 for operating the two dampers is provided. This rod or spindle is longer than the diameter of the pipe, is passed through holes or apertures in the pipe and in the lozenge-shaped bearings in the smoke-damper. It has a thumb-nut 5 at one end on the outside of the pipe and a nut or bur on the opposite end to hold it in place in the usual manner.

On the outside of the pipe A is a substantially triangular plate 7, with an elevated or flanged portion 8. This plate is screwed or bolted to the pipe on the outside, and the pipe has an opening out through its wall of the same form as the plate 7, but somewhat smaller in size. The damper 4 is of corresponding shape to the opening in the pipe, but sufficiently large to cover and close the opening. The plate or damper 4 is also mounted on the rod or spindle 6 back of the thumb-nut 5 and is adapted to be opened and closed with the smoke-damper. It is fixed to the spindle, so that when it is revolved to close the smoke-damper the draft-damper 4 is opened, and vice versa.

The draft-damper and its supporting-plate are preferably formed of the substantially triangular shape shown, but they may be of any suitable configuration.

From the foregoing description the operation of the dampers will be apparent.

From the construction of the smoke-damper, as shown and described, and when in use the dome or plate 2 is turned toward the stove or furnace and retards and prevents the heat from escaping up the pipe or flue. The annular plate or ring and its arrangement at some distance from the inverted dome prevent a direct draft, but sufficient open space is left for any smoke or gases to escape up the flue or pipe, and the arrangement of the draft-damper below the smoke-damper aids this operation, since the cooler air of the apartment is heaver than the hot air in the pipe.

When the smoke-damper is closed, the draft-damper 4 is open and through the opening in the pipe acts as a ventilator to the room or apartment.

When the smoke-damper is open, the draft-damper is closed. The smoke-damper is then in a vertical position in the inside of the pipe, as shown in Fig. 2, and allows full draft for the fire.

Minor details in the construction may be made without departing from the spirit or sacrificing any of the advantages of the invention.

Having thus fully described the invention, what I claim as new, and desire to secure by Letters Patent, is—

1. A combined heat and air damper comprising an annular plate having an inverted-dome-shaped plate depending therefrom, connected therewith at a suitable distance from each other and an exterior damper arranged to cover an opening in the pipe below the heat-damper and means for operating the same whereby when the smoke-damper is closed the air-damper is opened, substantially as described.

2. A combined heat and air damper comprising an annular plate and an inverted-dome-shaped plate connected together by means of feet or brackets at a suitable distance from each other, a segmental plate with an opening through it, exteriorly secured to the pipe which has a corresponding opening below the heat-damper; a segmental plate for covering said opening, and an operating rod or spindle, substantially as described.

In testimony whereof I affix my signature in presence of two witnesses.

JOHN EDWARD SLENTZ.

Witnesses:
W. H. TIPTON,
WM. HERSH.